United States Patent
Hao

(10) Patent No.: US 10,970,024 B2
(45) Date of Patent: Apr. 6, 2021

(54) DATA PROCESSING METHOD AND ELECTRONIC TERMINAL

(71) Applicant: HUAWEI TECHNOLOGIES CO., LTD., Guangdong (CN)

(72) Inventor: Huaqi Hao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/345,311

(22) PCT Filed: Oct. 28, 2016

(86) PCT No.: PCT/CN2016/103727
§ 371 (c)(1),
(2) Date: Apr. 26, 2019

(87) PCT Pub. No.: WO2018/076269
PCT Pub. Date: May 3, 2018

(65) Prior Publication Data
US 2019/0303082 A1    Oct. 3, 2019

(51) Int. Cl.
*G06F 3/14* (2006.01)
*G06F 3/0488* (2013.01)
(Continued)

(52) U.S. Cl.
CPC .............. *G06F 3/14* (2013.01); *G06F 3/0488* (2013.01); *G06F 3/147* (2013.01); *G06T 3/40* (2013.01);
(Continued)

(58) Field of Classification Search
CPC .......... G06F 3/14; G06F 3/0488; G06F 3/147; G06T 11/206; G06T 11/60
See application file for complete search history.

(56) References Cited

U.S. PATENT DOCUMENTS

2010/0146442 A1*  6/2010  Nagasaka ............... H04L 67/34
                                                          715/810
2012/0192082 A1*  7/2012  Bakalov ................ G06F 16/954
                                                          715/747
(Continued)

FOREIGN PATENT DOCUMENTS

CN    102722347 A    10/2012
CN    102752450 A    10/2012
(Continued)

OTHER PUBLICATIONS

PCT International Search Report and Written Opinion in International Application No. PCT/CN2016/103,727, dated Jun. 29, 2017, 17 pages (With English Translation).
(Continued)

*Primary Examiner* — Todd Buttram

(57) ABSTRACT

Example data processing methods and apparatus are provided. In one example, an electronic terminal obtains target data that includes at least one data item, converts the target data into a data image by using a data visualization technology, and then sets the data image as wallpaper, where the data image includes at least one graphic element, and the graphic element is in a one-to-one correspondence with the data item. The target data is user data, and may include operation event information of operating the electronic terminal by a user, or information that is associated with a user account and that is based on at least one network platform, so as to automatically generate the wallpaper and show the user data to the user by using the wallpaper.

12 Claims, 13 Drawing Sheets

(51) Int. Cl.
*G06T 11/60* (2006.01)
*G06T 3/40* (2006.01)
*G06T 11/20* (2006.01)
*G06F 3/147* (2006.01)
*H04W 88/02* (2009.01)

(52) U.S. Cl.
CPC ............ *G06T 11/206* (2013.01); *G06T 11/60* (2013.01); *G09G 2340/14* (2013.01); *H04W 88/02* (2013.01)

(56) References Cited

U.S. PATENT DOCUMENTS

| | | | | |
|---|---|---|---|---|
| 2013/0285948 | A1* | 10/2013 | Zhang | G06F 9/451 345/173 |
| 2013/0293573 | A1 | 11/2013 | Wolfe et al. | |
| 2014/0282025 | A1* | 9/2014 | Fan | G06F 16/958 715/736 |
| 2015/0309689 | A1* | 10/2015 | Jin | G06F 3/04883 715/765 |
| 2015/0334219 | A1 | 11/2015 | Soundararajan | |
| 2015/0355959 | A1* | 12/2015 | Kogan-Katz | G06F 11/0736 714/57 |
| 2016/0259499 | A1* | 9/2016 | Kocienda | G06F 3/04883 |
| 2017/0242556 | A1* | 8/2017 | Al-Jallad | G06Q 50/01 |
| 2019/0075433 | A1 | 3/2019 | Shan et al. | |
| 2019/0286756 | A1* | 9/2019 | Sweeney | G06F 40/16 |

FOREIGN PATENT DOCUMENTS

| | | |
|---|---|---|
| CN | 103052041 A | 4/2013 |
| CN | 103389855 A | 11/2013 |
| CN | 103442139 A | 12/2013 |
| CN | 104123077 A | 10/2014 |
| CN | 104123333 A | 10/2014 |
| CN | 104348714 A | 2/2015 |
| CN | 105867897 A | 8/2016 |
| WO | 2011060382 A1 | 5/2011 |
| WO | 2016093825 A1 | 6/2016 |

OTHER PUBLICATIONS

Extended European Search Report issued in European Application No. 16919896.7 dated Aug. 14, 2019, 13 pages.

* cited by examiner

DATA PROCESSING METHOD AND ELECTRONIC TERMINAL

CROSS-REFERENCE TO RELATED APPLICATIONS

This application is a national stage of International Application No. PCT/CN2016/103727, filed on Oct. 28, 2016, which is hereby incorporated by reference in its entirety.

TECHNICAL FIELD

The present invention relates to the field of computer technologies, and in particular, to a data processing method and an electronic terminal.

BACKGROUND

With rapid development of electronic technologies, electronic terminals with a display screen, such as a smartphone, a tablet computer, and a smart television, are widely applied in people's daily life. For the sake of beauty, wallpaper is usually set in a lock screen interface, a home interface, and the like of an electronic device. The wallpaper is classified into static wallpaper and live wallpaper. A user may set a specific picture as the wallpaper, or set a picture set that includes a plurality of pictures as the wallpaper, and the plurality of the pictures may be switched according to a particular rule.

However, the wallpaper currently set in the electronic terminal is usually a picture obtained from the Internet or a picture taken by using a camera in the electronic terminal, and is relatively singular. Therefore, user experience is relatively poor.

SUMMARY

Embodiments of the present invention provide a data processing method and an electronic terminal, so as to automatically generate wallpaper, show user data to a user by using the wallpaper, and improve user experience.

According to a first aspect, an embodiment of the present invention provides a data processing method. An electronic terminal obtains target data, converts the target data into a data image by using a data visualization technology, and then sets the data image as wallpaper. The target data is user data, and may include operation event information of operating the electronic terminal by a user, or information that is associated with a user account and that is based on at least one network platform. The target data includes at least one data item, the data image includes at least one graphic element, and the graphic element is in a one-to-one correspondence with the data item.

In the technical solution, the electronic terminal obtains the target data that includes the at least one data item, converts the target data into the data image by using the data visualization technology, and then sets the data image as the wallpaper, where the data image includes the at least one graphic element, and the graphic element is in a one-to-one correspondence with the data item. The target data is the user data, and may include the operation event information of operating the electronic terminal by the user, or the information that is associated with the user account and that is based on the at least one network platform, so as to automatically generate the wallpaper, show the user data to the user by using the wallpaper, and improve user experience.

With reference to the first aspect, in a first possible implementation of the first aspect, an implementation of obtaining target data by an electronic terminal may be: the electronic terminal obtains the target data in real time, so that the data image and the wallpaper are updated in real time based on the target data, so as to dynamically change the wallpaper with the target data.

With reference to the first aspect, in a second possible implementation of the first aspect, the data item may include a preset parameter corresponding to a target operation event. The data processing method may further include: detecting whether the target operation event occurs; and when the target operation event is detected, updating the preset parameter, in the data item, corresponding to the target operation event.

In the technical solution, by detecting a target operation, real-time update of target data corresponding to the target operation is implemented.

With reference to the first aspect, in a third possible implementation of the first aspect, an implementation of setting the data image as wallpaper by the electronic terminal may include: tailoring, by the electronic terminal, the data image based on a preset size, and then setting a tailored data image as the wallpaper, so that a size and/or a pixel of the wallpaper meet/meets requirements of display screens of different sizes.

With reference to the first aspect, in a fourth possible implementation of the first aspect, before the electronic terminal obtains the target data, the data processing method further includes: receiving, by the electronic terminal, an input screen wakeup operation, where the screen wakeup operation is used to trigger to enter a lock screen interface. Correspondingly, after the electronic terminal sets the data image as the wallpaper, the data processing method further includes: displaying the wallpaper in the lock screen interface.

In the technical solution, the wallpaper is applied to the lock screen interface, the target data is obtained only when the input screen wakeup operation is received, the target data is converted into the data image by using the data visualization technology, the data image is set as the wallpaper, and the wallpaper is displayed in the lock screen interface. This avoids high energy consumption caused by real-time processing of the target data by the electronic terminal.

With reference to the first aspect, in a fifth possible implementation of the first aspect, the data item includes a geographic location of a target contact, the target contact is a contact associated with the user account, and an implementation of converting preprocessed user data into a data image by using a data visualization algorithm may include: adding the graphic element to the geographic location on a preset map, to form the data image, so as to visually display, by using the wallpaper, the geographic location of the contact associated with the user.

With reference to the first aspect, in a sixth possible implementation of the first aspect, the data item includes a contact who uses a target application and a total quantity of users of the target application, and an implementation of converting preprocessed user data into a data image by using a data visualization algorithm may include: setting, based on the total quantity of the users of the target application, a parameter for the graphic element corresponding to the data item, and associating the contact who uses the target application with the graphic element for which the parameter is set, to form the data image, so as to visually display a total quantity of users of each application in contacts and a contact included in the total quantity of the users.

With reference to the second possible implementation of the first aspect, in a seventh possible implementation of the first aspect, the target operation event includes an event of visiting a target website, the preset parameter includes an identifier of the target website and a quantity of historical visiting times of the target website, and an implementation of converting target user data into a data image by using a data visualization technology may include: determining a parameter for the graphic element based on the identifier of the target website and the quantity of the historical visiting times, where the parameter includes at least one of a name, a size, chrominance, and transparency, and further setting, according to a preset rule, position coordinates of the graphic element for which the parameter is determined, to form the data image, so as to visually display a quantity of historical visiting times of each website visited by the user.

With reference to the second possible implementation of the first aspect, in an eighth possible implementation of the first aspect, the target operation event includes a retrieval event of a target keyword, the preset parameter includes retrieval frequency of the target keyword, and an implementation of converting the target data into a data image by using a data visualization technology may include: setting a target font size for the target keyword based on the retrieval frequency, and using the target keyword of the target font size as the graphic element, to form the data image, so as to visually display the retrieval frequency of each keyword retrieved by the user.

With reference to the second possible implementation of the first aspect, in a ninth possible implementation of the first aspect, the target operation event includes a jump event from a first application to a second application, the preset parameter includes an identifier of the first application, an identifier of the second application, and a start time of the second application, and an implementation of converting the target data into a data image by using a data visualization technology may include: arranging, in a preset direction, the identifier of the first application and the identifier of the second application in a sequence of a first-time start time of an application, and further using an arc that connects the identifier of the first application and the identifier of the second application as the graphic element, to form the data image, so as to visually display a jump situation of the user using an application program.

With reference to the second possible implementation of the first aspect, in a tenth possible implementation of the first aspect, the target operation event includes an opening event of a preset-type file, the preset-type file may be an ebook, an audio file, or the like, the preset parameter includes a cover picture corresponding to the preset-type file, and an implementation of converting the target data into a data image by using a data visualization technology may include: using a cover picture of a recently opened preset-type file as the graphic element, to form the data image, so as to visually display a recently read ebook or a recently listened audio file of the user.

According to a second aspect, an embodiment of the present invention further provides an electronic terminal, including:

an obtaining unit, configured to obtain target data, where the target data includes at least one data item, and the target data includes operation event information of operating the electronic terminal by a user, or information that is associated with a user account and that is based on at least one network platform;

a visualization unit, configured to convert the target data into a data image by using a data visualization technology, where the data image includes at least one graphic element, and the graphic element is in a one-to-one correspondence with the data item; and a setting unit, configured to set the data image as wallpaper.

With reference to the second aspect, in a first possible implementation of the second aspect, the obtaining unit is specifically configured to: obtain the target data in real time, and update the data image and the wallpaper in real time based on the target data.

With reference to the second aspect, in a second possible implementation of the second aspect, the data item includes a preset parameter corresponding to a target operation event, and the electronic terminal further includes:

a detection unit, configured to detect whether the target operation event occurs; and an update unit, configured to: when the target operation event is detected, update the preset parameter, in the data item, corresponding to the target operation event.

With reference to the second aspect, in a third possible implementation of the second aspect, the setting unit is specifically configured to:

tailor the data image based on a preset size; and
set a tailored data image as the wallpaper.

With reference to the second aspect, in a fourth possible implementation of the second aspect, the electronic terminal further includes:

a receiving unit, configured to receive an input screen wakeup operation, where the screen wakeup operation is used to trigger to enter a lock screen interface; and a display unit, configured to display the wallpaper in the lock screen interface.

With reference to the second aspect, in a fifth possible implementation of the second aspect, the data item includes a geographic location of a target contact, the target contact is a contact associated with the user account, and the visualization unit is specifically configured to:

add the graphic element to the geographic location on a preset map, to form the data image.

With reference to the second aspect, in a sixth possible implementation of the second aspect, the data item includes a contact who uses a target application and a total quantity of users of the target application, and the visualization unit is specifically configured to:

set, based on the total quantity of the users, a parameter for the graphic element corresponding to the data item; and associate the contact who uses the target application with the graphic element for which the parameter is set, to form the data image.

With reference to the second possible implementation of the second aspect, in a seventh possible implementation of the second aspect, the target operation event includes an event of visiting a target website, the preset parameter includes an identifier of the target website and a quantity of historical visiting times of the target website, and the visualization unit is specifically configured to:

determine a parameter for the graphic element based on the identifier of the target website and the quantity of the historical visiting times, where the parameter includes at least one of a name, a size, chrominance, and transparency; and set, according to a preset rule, position coordinates of the graphic element for which the parameter is determined, to form the data image.

With reference to the second possible implementation of the second aspect, in an eighth possible implementation of the second aspect, the target operation event includes a retrieval event of a target keyword, the preset parameter includes retrieval frequency of the target keyword, and the visualization unit is specifically configured to:

set a target font size for the target keyword based on the retrieval frequency; and use the target keyword of the target font size as the graphic element, to form the data image.

With reference to the second possible implementation of the second aspect, in a ninth possible implementation of the second aspect, the target operation event includes a jump event from a first application to a second application, the preset parameter includes an identifier of the first application, an identifier of the second application, and a start time of the second application, and the converting the target data into a data image by using a data visualization technology includes:

arranging, in a preset direction, the identifier of the first application and the identifier of the second application in a sequence of a first-time start time of an application; and using an arc that connects the identifier of the first application and the identifier of the second application as the graphic element, to form the data image.

With reference to the second possible implementation of the second aspect, in a tenth possible implementation of the second aspect, the target operation event includes an opening event of a preset-type file, and the preset parameter includes a cover picture corresponding to the preset-type file.

The visualization unit is specifically configured to use a cover picture of a recently opened preset-type file as the graphic element, to form the data image.

According to a third aspect, an embodiment of the present invention further provides another electronic terminal, including: a processor, a memory, an input apparatus, and an output apparatus. The processor is connected to the memory and the input/output apparatus, for example, the processor may be connected to the memory and the input/output apparatus by using a bus. The input apparatus is configured to obtain target data, and the output device is configured to output and display a data image. The storage area is configured to store program code for performing the foregoing data processing method. The processor is configured to perform some or all of processes of the first aspect.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
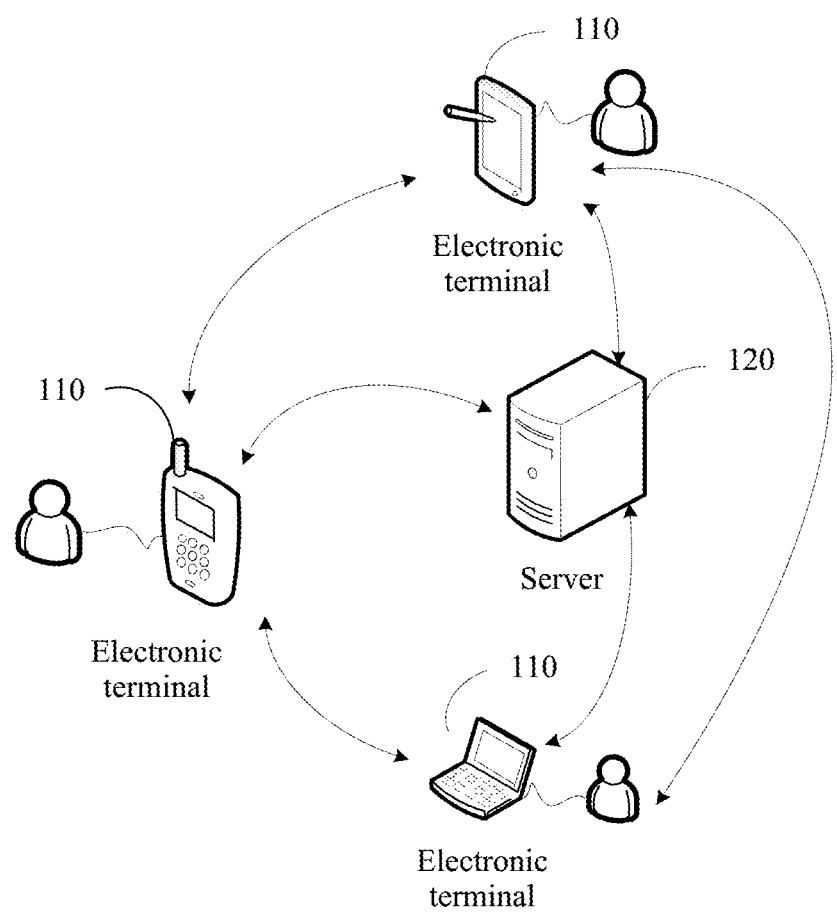
FIG. 1 is a schematic architectural diagram of a data processing system according to an embodiment of the present invention.

The embodiments of the present invention may be implemented based on a single electronic terminal, or may be implemented based on a schematic architectural diagram of a data processing system provided in an embodiment of the present invention shown in FIG. 1. The data processing system may include at least one electronic terminal 110 and/or at least one server 120. The electronic terminal may include but is not limited to a smartphone, a tablet computer, a desktop computer, a mobile computer, a smart television, a smart band, a personal digital assistant (Personal Digital Assistant, PDA), a media playing device, and the like. Communication may be performed between electronic terminals 110, and between the electronic terminal 110 and the server 120 by using a wireless network or a wired network. The server may be a server of various network platforms, for example, a social network platform such as WeChat, Tencent QQ, a microblog, a blog, MSN (Microsoft Service Network), or Facebook, and for another example, a network platform that can log in to a user account, such as Vmall (English: Vmall), Google, Amazon, or YouTube.

It may be understood that the electronic terminal 110 may record user data when a user uses the electronic terminal 110, and the user data may include information about an operation event generated when the user operates the electronic terminal. For example, the operation event may be an operation event for the user to start an application program on the electronic terminal 110, and corresponding operation event information may include a time and a location for starting the application program, and/or a quantity of historical start times, or the like. For another example, the operation event may be a retrieval event of a target keyword, and corresponding operation event information may include a retrieval time, a location, and/or a quantity of times, or the like of the target keyword. The user data may further include information that is associated with the user account and that is based on at least one network platform, and the network platform may include the social network platform such as WeChat, Tencent QQ, or Facebook, or may be the network platform that can store user information, such as Vmall, Google, Amazon, or YouTube. The user data may be the user information under the user account, for example, user's personal information recorded under a user account of WeChat, which may include a browsed website, a chat record, contact information, or the like; and for another example, browsed commodity information under a user account recorded on the network platform "Vmall". The user data may be the information associated with the user account, for example, information published in a friend account that is associated with the user account of WeChat, which is, for example, information such as news update and an address that are published by a friend.

It may be understood that, the electronic terminal 110 in "the operation event information of operating the electronic terminal 110" by the user may be the electronic terminal described in an execution body of the present invention, or may be an electronic terminal associated with the electronic terminal described in the execution body of the present invention, for example, the tablet computer with the same login account as a mobile phone serving as the execution body, or the smart band, a smart television, and the like that are bound to the mobile phone serving as the execution body. The user may perform an operation on different electronic terminals 110, to generate and record the operation event information, and the operation event information recorded on the electronic terminal may be transmitted between the electronic terminals 110 by using a communication connection.

Figure 2:
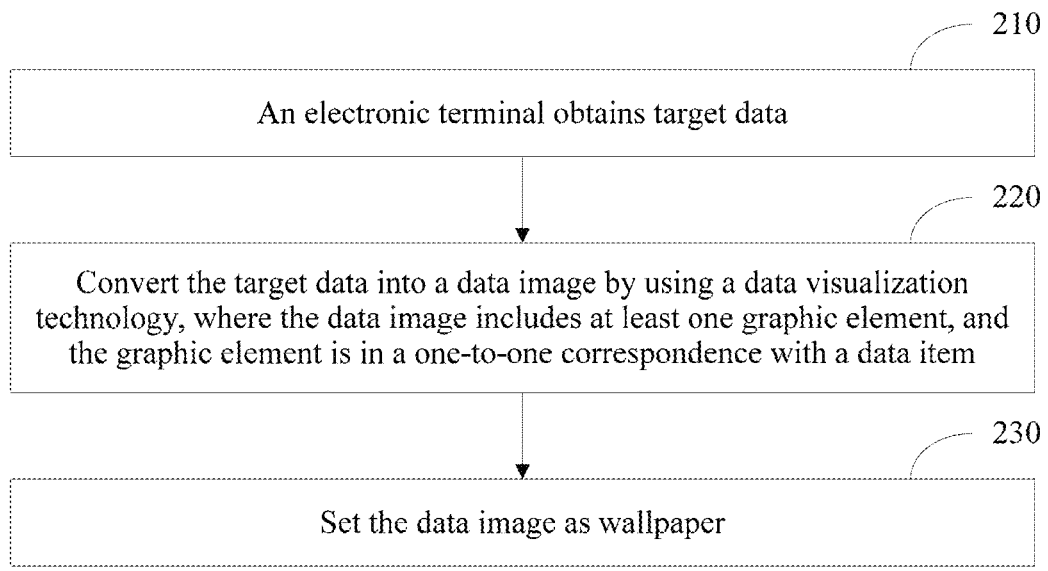
FIG. 2 is a schematic flowchart of a data processing method according to an embodiment of the present invention.

Referring to FIG. 2, FIG. 2 is a schematic flowchart of a data processing method according to an embodiment of the present invention. The data processing method includes the following steps.

Step S210. An electronic terminal obtains target data, where the target data includes at least one data item, and the target data includes operation event information of operating the electronic terminal by a user, or information that is associated with a user account and that is based on at least one network platform.

Specifically, the electronic terminal may obtain the target data, where the target data is user data and may include the operation event information of operating the electronic terminal by the user, or the information that is associated with the user account and that is based on the at least one network platform. The data item is a minimum unit discussed in a data structure, is a most basic and indivisible named data unit in a data record, and is a minimum identification unit having an independent meaning. The data item may be one of or a combination of a letter, a character, an image, a number, or the like. For example, the target data is a quantity of historical start times of an application program. In this case, the data item includes a quantity of historical start times of a target application program, for example, a quantity of historical start times of an application program "Vmall".

It may be understood that the operation event information generated when the user operates the electronic terminal may be: each website visited by the electronic terminal and a time, a location, a quantity of historical visiting times, and the like of visiting each website; each keyword retrieved on the electronic terminal and a retrieval time, a location, retrieval frequency, and the like of each keyword; information recorded during a jump from one application to another application in the electronic terminal; a time, a location, and the like of opening a preset-type file such as an ebook or audio file by the electronic terminal; and historical duration and the like of running each application by the electronic terminal. The information associated with the user account may be: information published by the user by logging in to the network platform, for example, personal information, a log, and a geographic location; or a contact associated with the user, for example, a friend of the user on a network dating platform such as WeChat or Tencent QQ, where the friend can log in to the network dating platform to publish his/her personal information, a log, a geographic location, an application in use, and the like, and the user has a permission to obtain the information; or a browsed commodity, a purchased commodity, or the like under a user account of a network platform such as a shopping website.

Optionally, an implementation of obtaining the target data by the electronic terminal may include: obtaining, by the electronic terminal, the user data; and selecting the target data based on the user data, or calculating the target data based on the user data. For example, the user data is ages, genders, geographic locations, and quantities of historical chat times of all contacts associated with the user. The electronic terminal may select the geographic locations of all the contacts based on the user data and use the geographic locations of all the contacts as the target data, and the data item is a geographic location of any contact. For another example, the electronic terminal may collect statistics on the user data by age and obtain a quantity of contacts born in each time period as the target data, and the data item may include a quantity of contacts born before 1980, a quantity of contacts born between 1980 and 1990, a quantity of contacts born between 1990 and 2000, and a quantity of contacts born after 2000.

Optionally, when the target data is stored in a server, another implementation of obtaining the target data by the electronic terminal may include: sending, by the electronic terminal, a data obtaining instruction to the server, where the data obtaining instruction is used to request to obtain the target data, and after receiving the data obtaining instruction, the server sends the target data to the electronic terminal. For example, the electronic terminal sends the data obtaining instruction to a server on which the network platform "Amazon" is located, and requests to obtain a name and an amount of a purchased commodity.

Step S220. Convert the target data into a data image by using a data visualization technology, where the data image includes at least one graphic element, and the graphic element is in a one-to-one correspondence with the data item.

Specifically, the data visualization technology means that data in a data set is represented in a form of a graphic image. The data visualization technology may be classified into a geometry-based technology, a pixel-oriented technology, an icon-based technology, a hierarchy-based technology, an image-based technology, and a distributed technology according to a principle of visualization. A basic idea of the data visualization technology is that each data item in a database is represented as a single graphic element, and a large quantity of data sets constitute the data image. In addition, various attribute values of data may be expressed in a form of multidimensional data, and the formed data image may be observed from different dimensions, so as to facilitate deeper observation and analysis of the data. It may be understood that the data image may be a two-dimensional planar image or a three-dimensional stereoscopic image.

In this embodiment of the present invention, the data item may include a geographic location of a target contact, and the target contact is a contact associated with the user account. Step S220 may specifically include: adding the graphic element to the geographic location on a preset map to form the data image, so as to visually display, by using wallpaper, the geographic location of the contact associated with the user.

Specifically, the target contact may be the friend of the user on the network dating platform such as WeChat or Tencent QQ, and the friend may share his/her geographic location by using the network dating platform. The user may obtain geographic location information shared by the friend, add the graphic element to the geographic location of the friend on the preset map with reference to a map application, and add graphic elements to geographic locations of all friends, so as to form the data image. The preset map may be a map of a preset area specified by the user, for example, a "map of Guangdong province". The geographic location may be determined longitude and latitude, or may be a location range, for example, a cell, a trading area, and an office building in which the friend is located. The graphic element may be a high-brightness point, or may be an icon used to mark the geographic location.

Figure 3:
FIG. 3 is a schematic diagram of a first data image according to an embodiment of the present invention.

Referring to FIG. 3, FIG. 3 is a schematic diagram of a first data image according to an embodiment of the present invention. In the data image shown in FIG. 3, a night map is used, lighting is simulated by using a high-brightness point, and the high-brightness point is marked at a geographic location of a friend, so as to form a data image, and a distribution status of the address position of the friend may be displayed based on a quantity and density of the high-brightness points in the area.

In this embodiment of the present invention, the data item includes a contact who uses a target application and a total quantity of users of the target application. Step S220 may specifically include: setting, based on the total quantity of the users of target application, a parameter for the graphic element corresponding to the data item, and associating the contact who uses the target application with the graphic element for which the parameter is set, to form the data image, so as to visually display a total quantity of users of each application in contacts and a contact included in the total quantity of the users. The parameter may be an area, a volume, a length, position coordinates, or the like.

Specifically, a target contact may be the friend of the user on the network dating platform such as WeChat or Tencent QQ, and the friend may share his/her application for use by using the network dating platform. The user may obtain a name of the application shared by the friend, and separately count a quantity of friends using each application, to obtain a total quantity of users of each application. Then, the user uses a sector of a particular radius as the graphic element, and uses the total quantity of the users of each application to separately determine an area or an angle of each sector, so as to form a pie chart. Alternatively, the user uses a rectangle of a particular width as the graphic element, and uses the total quantity of the users of each application to separately determine an area or a length of each rectangle, so as to form a bar chart. Alternatively, the user uses a point as the graphic element, and uses the total quantity of the users of each application to separately determine a location of each point, so as to form a line chart, and so on. Optionally, the graphic element for which the parameter is set may be associated with each contact who uses a corresponding application, and an association manner may be displaying, on the graphic element, information such as a portrait icon or a name of each contact who uses the corresponding application, or may be connecting, by using a line segment, the graphic element and the portrait icon and the name of each contact who uses the corresponding application.

Figure 4:
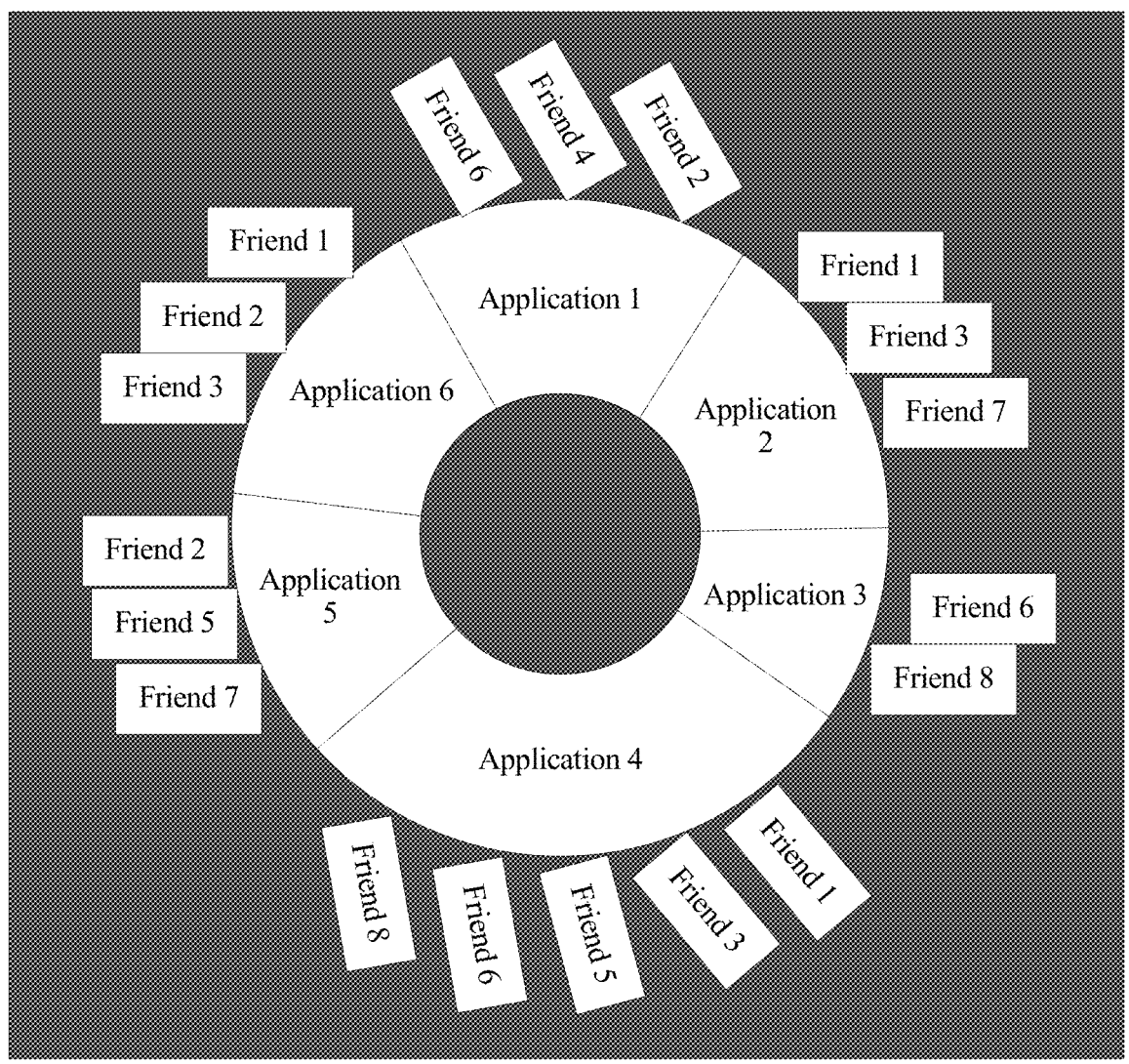
FIG. 4 is a schematic diagram of a second data image according to an embodiment of the present invention.

Referring to FIG. 4, FIG. 4 is a schematic diagram of a second data image according to an embodiment of the present invention. In the data image shown in FIG. 4, a pie chart is used to show a total quantity of users of each application among friends and friends who use each application, and the quantity of users of each application may be intuitively described by using an area size of each sector in the pie chart.

In this embodiment of the present invention, the data item may include a preset parameter corresponding to a target operation event. The data processing method may further include: detecting, by the electronic terminal, whether the target operation event occurs; and when the target operation event is detected, updating the preset parameter, in the data item, corresponding to the target operation event.

Specifically, the target operation event may be an operation event of starting the target application program by the user on the electronic terminal, and a corresponding preset parameter may include a time and a location for starting the application program, and/or a quantity of historical start times. For another example, the target operation event may be a retrieval event of a target keyword, and a corresponding preset parameter may include a retrieval time, a location, and/or a quantity of times, or the like of the target keyword. The electronic terminal may monitor a user operation in real time, and when detecting the target operation event, the electronic terminal updates the preset parameter corresponding to the target operation event, that is, updates the target data, and further updates the data image in real time.

Optionally, the target operation event may be an event of visiting a target website, and the preset parameter includes an identifier of the target website and a quantity of historical visiting times of the target website. Step S220 may include: determining a parameter for the graphic element based on the identifier of the target website and the quantity of the historical visiting times, where the parameter includes at least one of a name, a size, chrominance, and transparency, and further setting, according to a preset rule, position coordinates of the graphic element for which the parameter is determined, to form the data image, so as to visually display a quantity of historical visiting times of each website visited by the user.

The target website may be a website that has a preset domain name, for example, a domain name "huawei.com/cn" of Huawei website, and a domain name "sina.com/cn" of Sina website. The electronic terminal may identify, based on a website, a domain name to which the website belongs, and the identifier of the target website may be a name, a domain name, a logo (logotype), or the like of the website. The graphic element may be a geometric pattern or the like. For example, the electronic terminal may use the website name, the domain name, or the like corresponding to the target website as the name of the graphic element, and determine the size of the graphic element by using the quantity of the historical visiting times of the target website.

Figure 5:
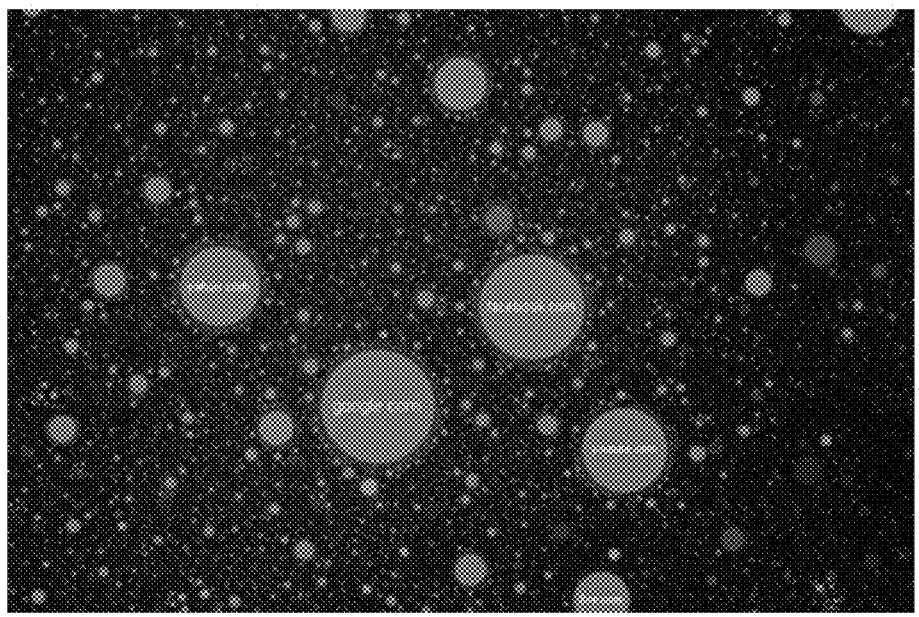
FIG. 5 is a schematic diagram of a third data image according to an embodiment of the present invention.

Referring to FIG. 5, FIG. 5 is a schematic diagram of a third data image according to an embodiment of the present invention. In the data image shown in FIG. 5, starry sky is simulated, a circle is used as the graphic element, the quantity of the historical visiting times of the target website is used to set a radius of the circle, and the quantity of the historical visiting times is positively correlated with the radius of the circle. The domain name of the target website is used as a name of the circle, various graphic elements are randomly distributed, and the quantity of the historical visiting times of each website visited by an electronic terminal may be intuitively described by using a size of the circle.

Optionally, the target operation event may be a retrieval event of a target keyword, and the preset parameter includes retrieval frequency of the target keyword. Step S220 may include: setting a target font size for the target keyword based on the retrieval frequency, and using the target keyword of the target font size as the graphic element, to form the data image, so as to visually display the retrieval frequency of each keyword retrieved by the user.

Figure 6:
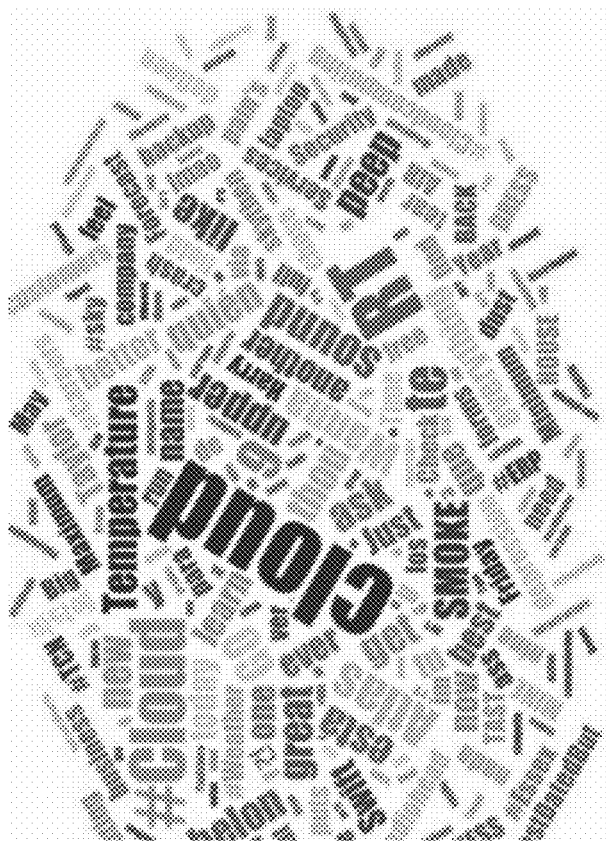
FIG. 6 is a schematic diagram of a fourth data image according to an embodiment of the present invention.

Referring to FIG. 6, FIG. 6 is a schematic diagram of a fourth data image according to an embodiment of the present invention. In the data image shown in FIG. 6, keywords of the target font size are randomly distributed, colors of the keywords are randomly set, and a field concerned about by the user is intuitively described by using a font size of a keyword.

Figure 7:
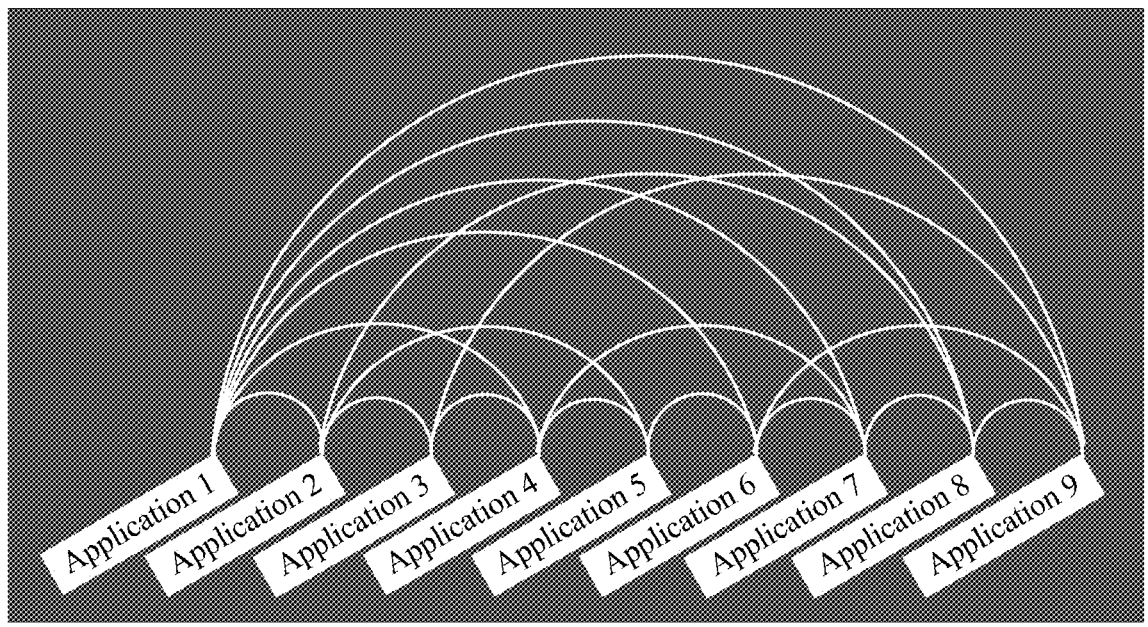
FIG. 7 is a schematic diagram of a fifth data image according to an embodiment of the present invention.

Optionally, referring to FIG. 7, FIG. 7 is a schematic diagram of a fifth data image according to an embodiment of the present invention. The target operation event may be a jump event from a first application to a second application, and the preset parameter includes an identifier of the first application, an identifier of the second application, and a start time of the second application. Step S220 may include: arranging, in a preset direction, the identifier of the first application and the identifier of the second application in a sequence of a first-time start time of an application, and further using an arc that connects the identifier of the first application and the identifier of the second application as the graphic element, to form the data image, so as to visually display a jump situation of the user using the application program. The identifier of the application may be a name, an icon, or the like of the application.

Optionally, the target operation event may be an opening event of a preset-type file, the preset-type file may be the ebook, the audio file, and the like, and the preset parameter includes a cover picture corresponding to the preset-type file. Step S220 may include: using a cover picture of a recently opened preset-type file as the graphic element, to form the data image, so as to visually display a recently read ebook or a recently listened audio file of the user. A file type may be determined by using a file format, for example, a file in a format such as "txt" and "Pdf" is an ebook, and a file in a format such as "MP3", "avm", "mvk", and "fly" is an audio file.

Figure 8:
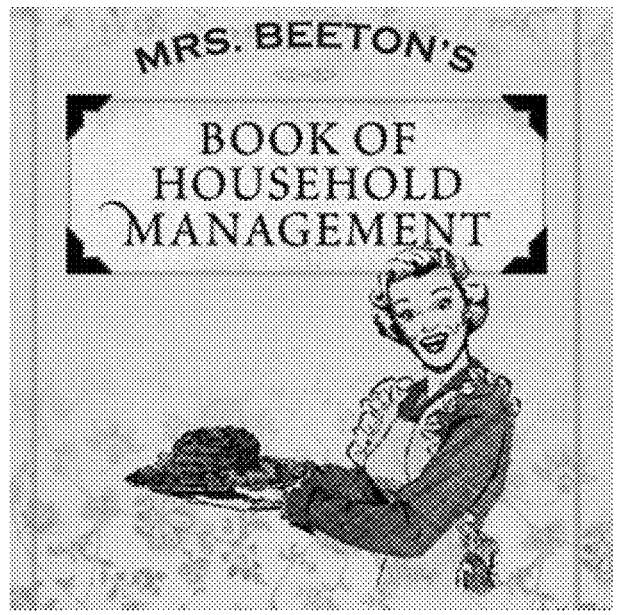
FIG. 8 is a schematic diagram of a sixth data image according to an embodiment of the present invention.

Referring to FIG. 8, FIG. 8 is a schematic diagram of a sixth data image according to an embodiment of the present invention. The preset-type file is the ebook, and the preset parameter is a cover picture corresponding to the ebook. The electronic terminal monitors an opening operation of the ebook in real time, and the preset parameter is updated in real time to a cover picture of a recently opened ebook. The electronic terminal uses the cover picture of the recently opened ebook as the graphic element, to form the data image.

Step S230. Set the data image as wallpaper.

Specifically, the electronic terminal sets the data image as the wallpaper, and the wallpaper may be displayed in a home interface of the electronic terminal, or may be displayed in a lock screen interface of the electronic terminal.

Optionally, step S230 may specifically include tailoring the data image based on a preset size, and setting a tailored data image as the wallpaper.

An implementation of tailoring the data image based on the preset size may be: the electronic terminal obtains a size of a display screen, and tailors the data image to the preset size that matches the size of the display screen. An implementation of tailoring the data image based on the preset size may further be: obtaining a tailored area selected by the user, and tailoring the data image. An implementation of tailoring the data image based on the preset size may further be: the electronic terminal determines a central location of the data image based on a distribution status of the graphic element in the data image, and tailors the data image by using the central location as a preset coordinate point of the wallpaper. The preset coordinate point may be a geometric center of the wallpaper, or may be a golden section point of the wallpaper, or the like. For example, the electronic terminal may perform tailoring by using a location of a graphic element of a maximum size as the central location, or using an area with the densest graphic elements as the central location. Optionally, the central location may be used as the golden section point of the wallpaper, and the golden section point is an intersection point of a golden section line in a vertical direction of the wallpaper and a golden section line in a horizontal direction of the wallpaper.

Figure 9:
FIG. 9 is a schematic diagram of first wallpaper according to an embodiment of the present invention.

Referring to FIG. 9, FIG. 9 is a schematic diagram of first wallpaper according to an embodiment of the present invention. FIG. 9 is the wallpaper tailored from the data image shown in FIG. 3. Specifically, an area with the densest high-brightness points is used as the central location, the central location is used as the golden section point of the wallpaper, and tailoring is performed based on the size of the display screen. When the target data changes, a size of a corresponding circle in the wallpaper dynamically changes, and the central location of the data image varies with the size of the circle. Therefore, a data image area displayed in the wallpaper also dynamically changes.

Figure 10:
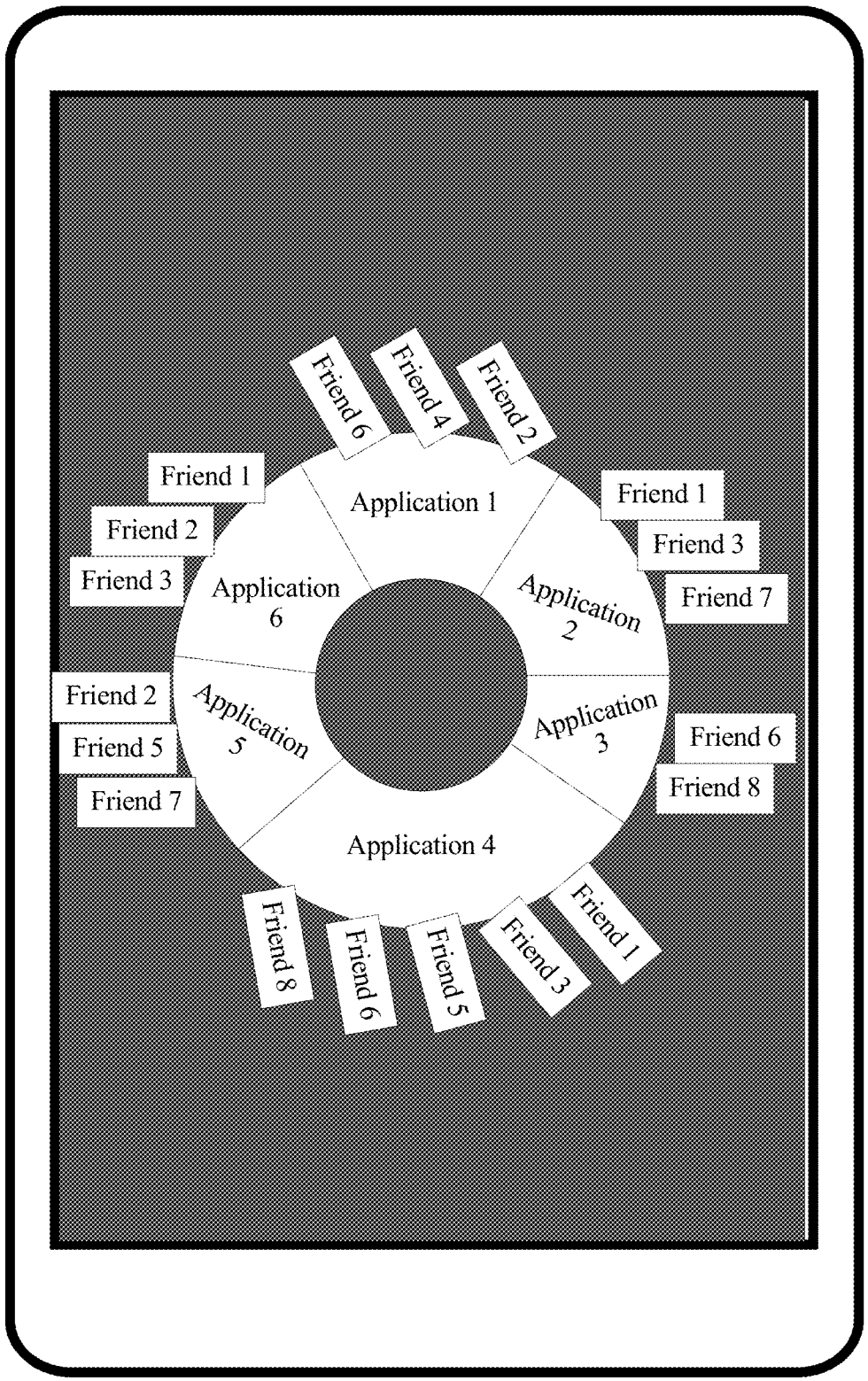
FIG. 10 is a schematic diagram of second wallpaper according to an embodiment of the present invention.

Referring to FIG. 10, FIG. 10 is a schematic diagram of second wallpaper according to an embodiment of the present invention. FIG. 10 is the wallpaper tailored from the data image shown in FIG. 4.

Figure 11:
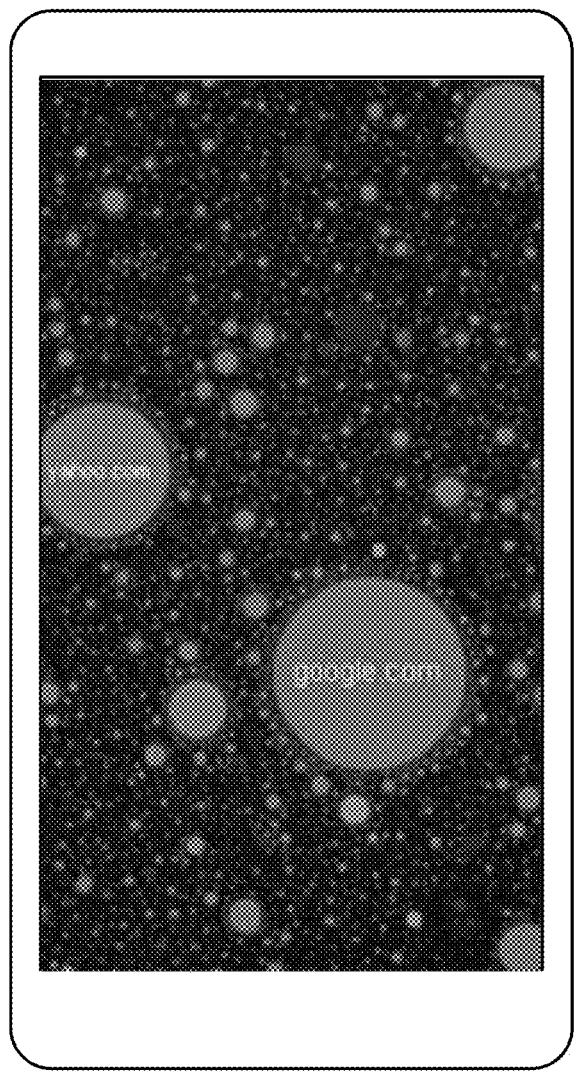
FIG. 11 is a schematic diagram of third wallpaper according to an embodiment of the present invention.

Referring to FIG. 11, FIG. 11 is a schematic diagram of third wallpaper according to an embodiment of the present invention. FIG. 10 is the wallpaper tailored from the data image shown in FIG. 5.

Figure 12:
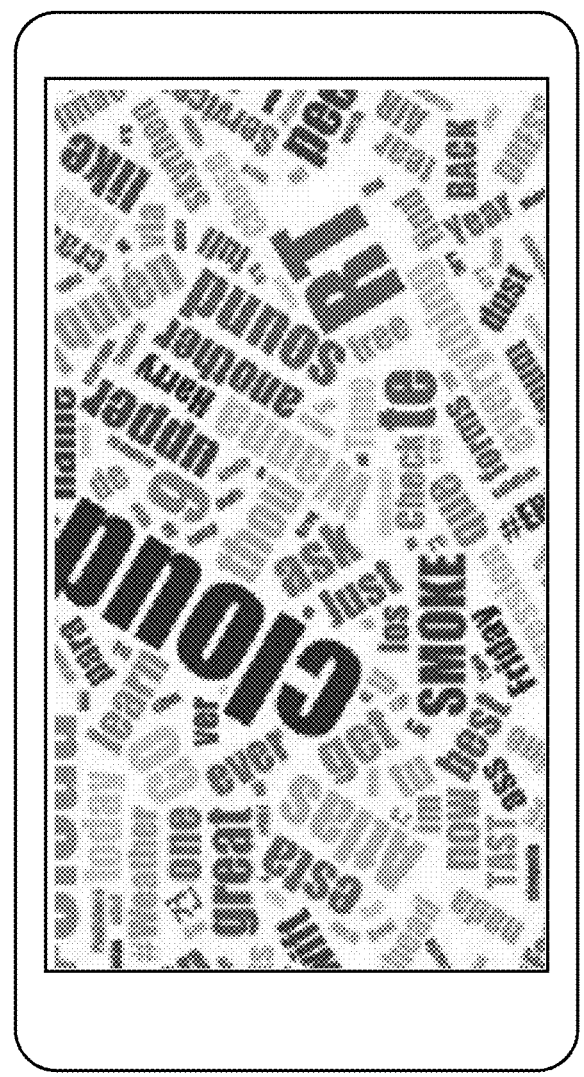
FIG. 12 is a schematic diagram of fourth wallpaper according to an embodiment of the present invention.

Referring to FIG. 12, FIG. 12 is a schematic diagram of fourth wallpaper according to an embodiment of the present invention. FIG. 10 is the wallpaper tailored from the data image shown in FIG. 6.

Figure 13:
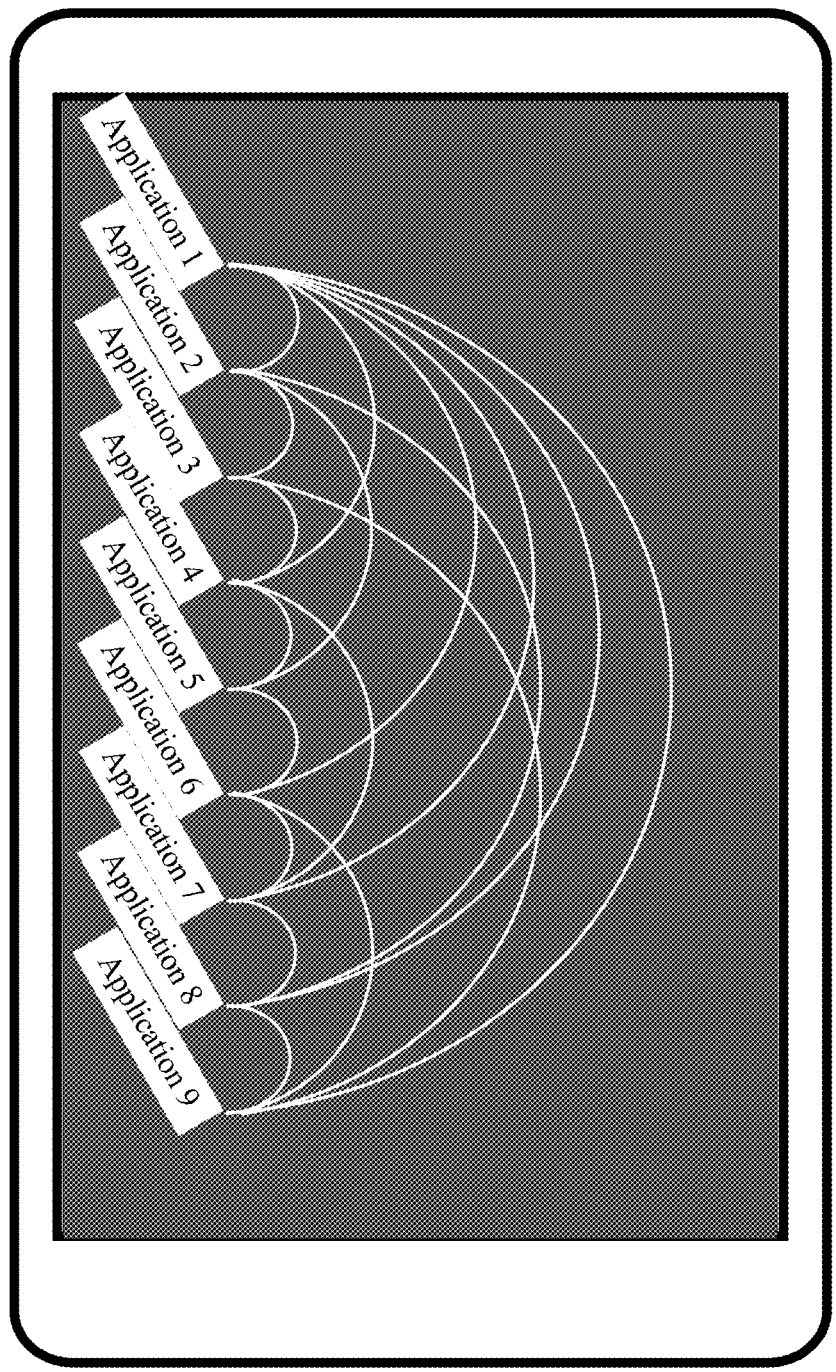
FIG. 13 is a schematic diagram of fifth wallpaper according to an embodiment of the present invention.

Referring to FIG. 13, FIG. 13 is a schematic diagram of fifth wallpaper according to an embodiment of the present invention. FIG. 10 is the wallpaper tailored from the data image shown in FIG. 7.

Figure 14:
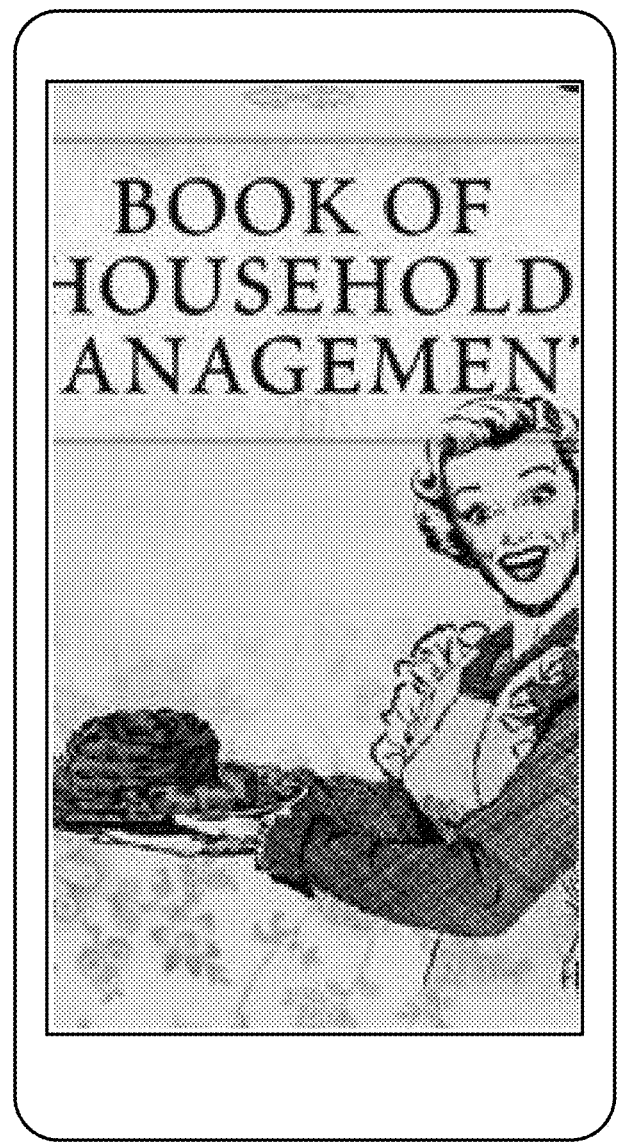
FIG. 14 is a schematic diagram of sixth wallpaper according to an embodiment of the present invention.

Referring to FIG. 14, FIG. 14 is a schematic diagram of sixth wallpaper according to an embodiment of the present invention. FIG. 10 is the wallpaper tailored from the data image shown in FIG. 8.

It may be understood that image elements in the wallpaper shown in FIG. 10 to FIG. 14 dynamically vary with the target data.

In this embodiment of the present invention, before step S210, the data processing method may further include: receiving an input screen wakeup operation, where the screen wakeup operation is used to trigger to enter a lock screen interface; and correspondingly, after step S230, the data processing method may further include: displaying the wallpaper in the lock screen interface.

The screen wakeup operation may be pressing a power button, a double-tap operation on an electronic terminal touchscreen, or the like. In the technical solution, the electronic terminal obtains the target data only when receiving the input screen wakeup operation, converts the target data into the data image by using the data visualization technology, sets the data image as the wallpaper, and displays the wallpaper in the lock screen interface. This avoids high energy consumption caused by real-time processing of the target data by the electronic terminal.

In this embodiment of the present invention, the electronic terminal may refresh the target data once every preset time period, for example, refresh the target data once every 20 minutes, 60 minutes, one day, or the like. Alternatively, the electronic terminal may refresh the target data once when detecting a preset operation, and the preset operation may be the screen wakeup operation, a tapping operation, a double-tap operation, a sliding operation, a touch and hold operation, or the like for the data image in the home interface or the lock screen interface of the electronic terminal, so that the data image dynamically varies with update of the target data, and at the same time, high energy consumption caused by real-time update of the target data by the electronic terminal is avoided.

In another embodiment of the present invention, the target data may also be displayed in a form other than the wallpaper, for example, a matter notification that the user may be concerned about, a to-do reminder obtained by analyzing based on a behavior habit of the user, pushing of content (an image, a text, an APP, music, and the like), recommendation of a similar friend, and the like.

In this embodiment of the present invention, the electronic terminal obtains the target data that includes the at least one data item, converts the target data into the data image by using the data visualization technology, and then sets the data image as the wallpaper, where the data image includes the at least one graphic element, and the graphic element is in a one-to-one correspondence with the data item. The target data is the user data, and may include the operation event information of operating the electronic terminal by the user, or the information that is associated with the user account and that is based on the at least one network platform, so as to automatically generate the wallpaper and improve user experience.

In addition, the user data may be displayed by using the wallpaper, and the wallpaper dynamically varies with update of the user data.

Figure 15:
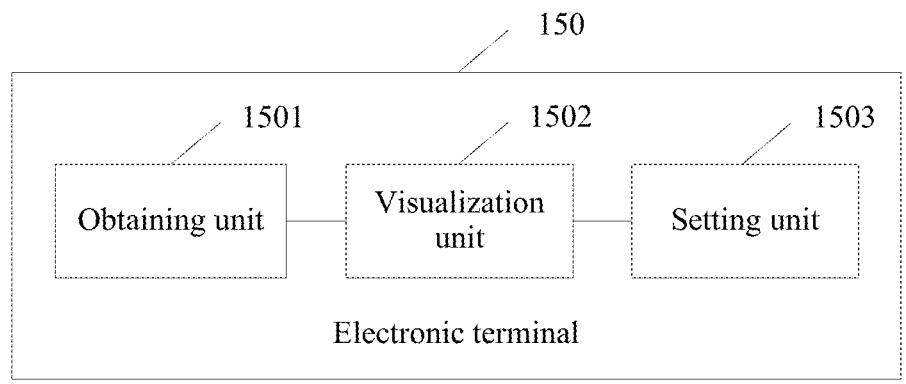
FIG. 15 is a schematic structural diagram of an electronic device according to an embodiment of the present invention.

Referring to FIG. 15, FIG. 15 is a schematic structural diagram of an electronic device according to an embodiment of the present invention. The electronic terminal 150 may include: an obtaining unit 1501, a visualization unit 1502, and a setting unit 1503.

The obtaining unit 1501 is configured to obtain target data, where the target data includes at least one data item, and the target data includes operation event information of operating the electronic terminal by a user, or information that is associated with a user account and that is based on at least one network platform.

The visualization unit 1502 is configured to convert the target data into a data image by using a data visualization technology, where the data image includes at least one graphic element, and the graphic element is in a one-to-one correspondence with the data item.

The setting unit 1503 is configured to set the data image as wallpaper.

Optionally, the obtaining unit 1501 is specifically configured to: obtain the target data in real time, and update the data image and the wallpaper in real time based on the target data.

Optionally, the setting unit 1503 is specifically configured to: tailor the data image based on a preset size, and set a tailored data image as the wallpaper.

Optionally, the data item includes a geographic location of a target contact, the target contact is a contact associated with the user account, and the visualization unit 1502 is specifically configured to:

add the graphic element to the geographic location on a preset map, to form the data image.

Optionally, the data item includes a contact who uses a target application and a total quantity of users of the target application, and the visualization unit 1502 is specifically configured to:

determine, based on the total quantity of the users, a preset parameter for the graphic element corresponding to the data item; and associate the contact who uses the target application with the graphic element for which the parameter is set, to form the data image.

Figure 16:
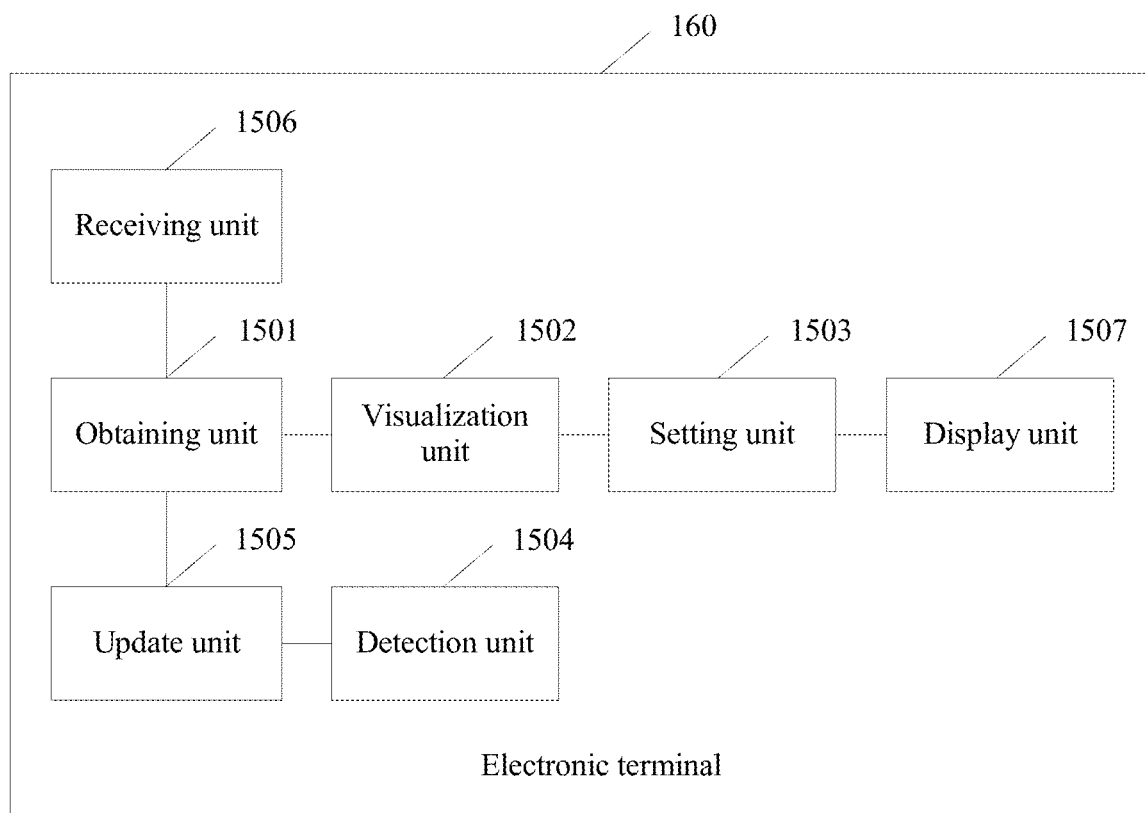
FIG. 16 is a schematic structural diagram of another electronic device according to an embodiment of the present invention.

Referring to FIG. 16, FIG. 16 is a schematic structural diagram of another electronic device according to an embodiment of the present invention. In addition to the units in the electronic terminal 150 shown in FIG. 15, the electronic terminal 160 may further include: a detection unit 1504, an update unit 1505, a receiving unit 1506, and a display unit 1507.

In this embodiment of the present invention, the data item includes a preset parameter corresponding to a target operation event, and the electronic terminal 16 further includes:

The detection unit 1504 is configured to detect whether the target operation event occurs.

The update unit 1505 is configured to: when the target operation event is detected, update the preset parameter, in the data item, corresponding to the target operation event.

Optionally, the target operation event includes an event of visiting a target website, the preset parameter includes an identifier of the target website and a quantity of historical visiting times of the target website, and the visualization unit 1502 is specifically configured to:

determine a parameter for the graphic element based on the identifier of the target website and the quantity of the historical visiting times, where the parameter includes at least one of a name, a size, chrominance, and transparency; and set, according to a preset rule, position coordinates of the graphic element for which the parameter is determined, to form the data image.

Optionally, the target operation event includes a retrieval event of a target keyword, and the preset parameter includes retrieval frequency of the target keyword, and the visualization unit 1502 is specifically configured to:

set a target font size for the target keyword based on the retrieval frequency; and use the target keyword of the target font size as the graphic element, to form the data image.

Optionally, the target operation event includes a jump event from a first application to a second application, the preset parameter includes an identifier of the first application, an identifier of the second application, and a start time of the second application, and the visualization unit 1502 is specifically configured to:

arrange, in a preset direction, the identifier of the first application and the identifier of the second application in a sequence of a first-time start time of an application; and use an arc that connects the identifier of the first application and the identifier of the second application as the graphic element, to form the data image.

Optionally, the target operation event includes an opening event of a preset-type file, and the preset parameter includes a cover picture corresponding to the preset-type file.

The visualization unit 1502 is specifically configured to use a cover picture of a recently opened preset-type file as the graphic element, to form the data image.

In this embodiment of the present invention, the electronic terminal 160 further includes:

a receiving unit 1606, configured to receive an input screen wakeup operation, where the screen wakeup operation is used to trigger to enter a lock screen interface; and a display unit 1607, configured to display the wallpaper in the lock screen interface.

It should be noted that functions of the obtaining unit 1501, the visualization unit 1502, the setting unit 1503, the detection unit 1504, the update unit 1505, the receiving unit 1506, and the display unit 1507 in the electronic terminal 150 or the electronic terminal 160 in the embodiments of the present invention may be specifically implemented according to the method in the foregoing method embodiment. For a specific implementation process, refer to related descriptions of the implementations described in the foregoing method embodiment, and details are not described herein again.

Figure 17:
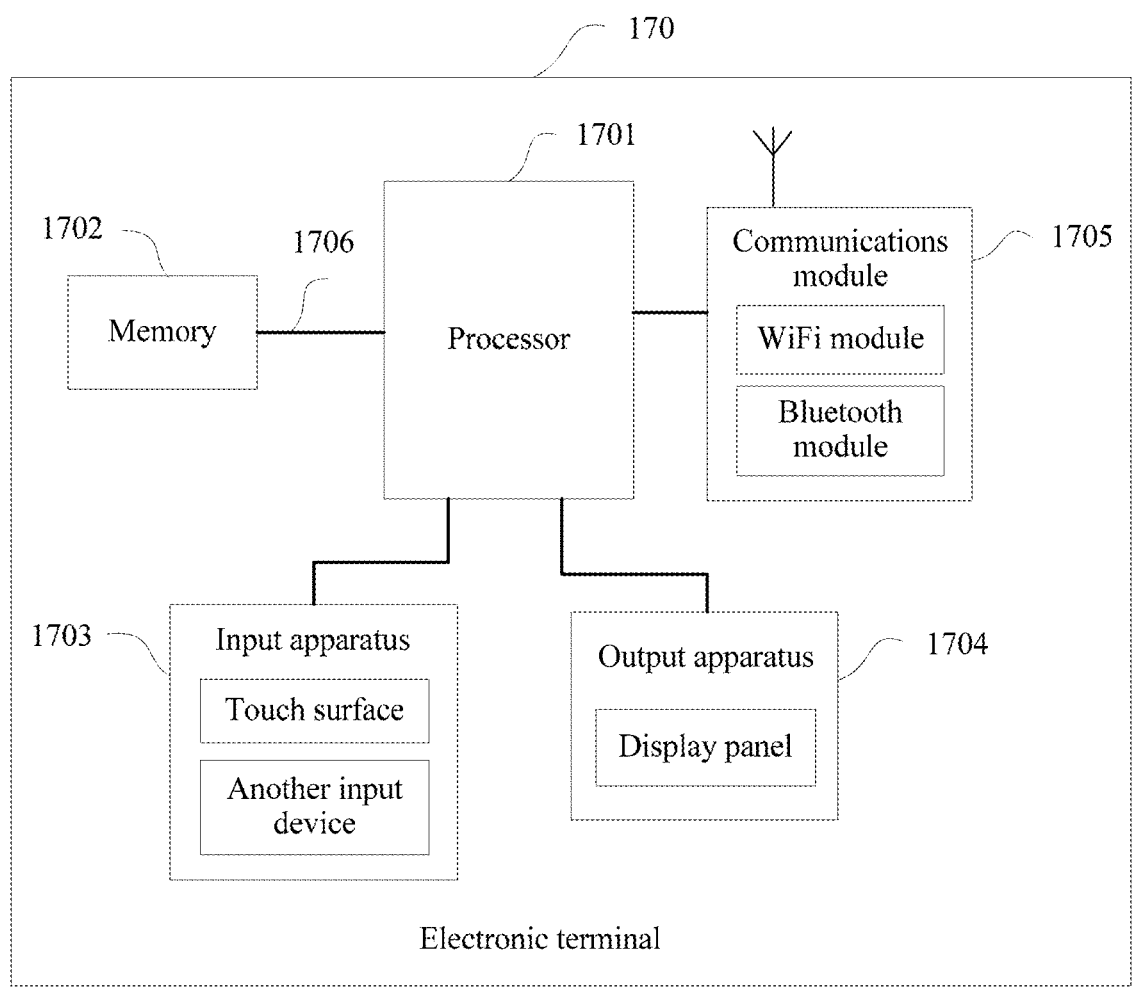
FIG. 17 is a schematic structural diagram of still another electronic terminal according to an embodiment of the present invention.

Referring to FIG. 17, FIG. 17 is a schematic structural diagram of still another electronic terminal according to an embodiment of the present invention. As shown in FIG. 17, the electronic terminal 170 may include: at least one processor 1701 such as a CPU, a memory 1702, an input apparatus 1703, an output apparatus 1704, and a communications module 1705. The processor is connected to the memory 1702, the input apparatus 1703, and the output apparatus 1704. For example, the processor 1701 may be connected to the memory 1702, the input apparatus 1703, and the output apparatus 1704 by using a bus 1706. The input apparatus 1703 is configured to obtain target data, and the output apparatus 1704 is configured to output and display a data image. The communications module 1705 is configured to implement data transmission between the electronic terminal 170 and another electronic terminal or a server. The memory 1702 is configured to store program code that performs the foregoing data processing method, and the target data. The processor 1701 is configured to: invoke the memory 1702 to store the program code of the data processing method, and perform the following steps:

obtaining the target data stored in the memory 1702 or obtaining the target data by using the input apparatus 1703, where the target data includes at least one data item, and the target data includes operation event information of operating the electronic terminal by a user, or information that is associated with a user account and that is based on at least one network platform;

converting the target data into a data image by using a data visualization technology, where the data image includes at least one graphic element, and the graphic element is in a one-to-one correspondence with the data item; and setting the data image as wallpaper.

In this embodiment of the present invention, the processor 1701 is further configured to: when performing the step of obtaining the target data stored in the memory 1702 or obtaining the target data by using the input apparatus 1703, obtain, in real time, the target data stored in the memory 1702 or obtain the target data in real time by using the input apparatus 1703; and update the data image and the wallpaper in real time based on the target data.

In this embodiment of the present invention, the processor 1701 is further configured to: when performing the step of setting the data image as wallpaper, tailor the data image based on a preset size; and set a tailored data image as the wallpaper.

Optionally, the data item includes a geographic location of a target contact, the target contact is a contact associated with the user account, and the processor 1701 is further configured to: when performing the step of converting preprocessed user data into a data image by using a data visualization algorithm, add the graphic element to the geographic location on a preset map, to form the data image.

Optionally, the data item includes a contact who uses a target application and a total quantity of users of the target application, and the processor 1701 is further configured to: when performing the step of converting preprocessed user data into a data image by using a data visualization algorithm, set, based on the total quantity of the users, a parameter for the graphic element corresponding to the data item; and associate the contact who uses the target application with the graphic element for which the parameter is set, to form the data image.

In this embodiment of the present invention, the data item includes a preset parameter corresponding to a target operation event, and the processor 1701 is further configured to:

detect whether the target operation event occurs; and when the target operation event is detected, update the preset parameter, in the target data stored in the memory 1702, corresponding to the target operation event.

Optionally, the target operation event includes an event of visiting a target website, the preset parameter includes an identifier of the target website and a quantity of historical visiting times of the target website, and the processor 1701 is further configured to: when performing the step of converting preprocessed user data into a data image by using a data visualization algorithm, determine a parameter for the graphic element based on the identifier of the target website and the quantity of the historical visiting times, where the parameter includes at least one of a name, a size, chrominance, and transparency; and set, according to a preset rule, position coordinates of the graphic element for which the parameter is determined, to form the data image.

Optionally, the target operation event includes a retrieval event of a target keyword, and the preset parameter includes retrieval frequency of the target keyword, and the processor 1701 is further configured to: when performing the step of converting preprocessed user data into a data image by using a data visualization algorithm, set a target font size for the target keyword based on the retrieval frequency; and use the target keyword of the target font size as the graphic element, to form the data image.

Optionally, the target operation event includes a jump event from a first application to a second application, the preset parameter includes an identifier of the first application, an identifier of the second application, and a start time of the second application, and the processor 1701 is further configured to: when performing the step of converting preprocessed user data into a data image by using a data visualization algorithm, arrange, in a preset direction, the identifier of the first application and the identifier of the second application in a sequence of a first-time start time of an application; and use an arc that connects the identifier of the first application and the identifier of the second application as the graphic element, to form the data image.

Optionally, the target operation event includes an opening event of a preset-type file, and the preset parameter includes a cover picture corresponding to the preset-type file.

The processor 1701 is further configured to: when performing the step of converting preprocessed user data into a data image by using a data visualization algorithm, use a cover picture of a recently opened preset-type file as the graphic element, to form the data image.

In this embodiment of the present invention, before performing the step of obtaining the target data stored in the memory 1702 or obtaining the target data by using the input apparatus 1703, the processor 1701 is further configured to receive an input screen wakeup operation by using the input apparatus 1703, where the screen wakeup operation is used to trigger to enter a lock screen interface. Correspondingly, after performing the step of setting the data image as wallpaper, the processor 1701 is further configured to display the wallpaper in the lock screen interface by using the output apparatus 1704.

It should be noted that, the input apparatus 1703 is configured to implement interaction between the user and the mobile terminal 170 and/or input of information into the mobile terminal 170. For example, the input apparatus 1703 may receive digit information or character information input by the user, so as to generate signal input related to user setting or function control. In a specific implementation of the present invention, the input apparatus 1703 may be a touch panel, or may be another human-machine interaction interface such as a physical input key or a microphone, or may be another external information capturing apparatus such as a camera. The touch panel, also referred to as a touchscreen, may collect operation actions of the user touching or approaching the touch panel. For example, the user performs the operation actions on the touch panel or at a position near the touch panel by using any appropriate object or accessory such as a finger or a stylus, and a corresponding connection apparatus is driven based on a preset program.

The output apparatus 1704 includes but is not limited to an image output unit, a sound output unit, and a touch output unit. The image output unit is configured to output a text, a picture, and/or a video. The image output unit may include a display panel, for example, a display panel configured in a form of an LCD (Liquid Crystal Display, liquid crystal display), an OLED (Organic Light-Emitting Diode, organic light-emitting diode), or a field emission display (field emission display, FED for short). Alternatively, the image output apparatus 1704 may include a reflective display, for example, an electrophoretic (electrophoretic) display or a display that uses an interferometric modulation of light (Interferometric Modulation of Light) technology. In FIG. 1, the input apparatus 1703 and the output apparatus 1704 serve as two independent parts to implement input and output functions of a mobile terminal. However, in some embodiments, the touch panel and the display panel may be integrated to implement the input and output functions of the mobile terminal. For example, the image output apparatus 1704 may display various graphical user interfaces (Graphical User Interface, GUI for short), so as to use the graphical user interfaces as virtual control components, and the graphical user interfaces include but are not limited to a window, a scrollbar, an icon, and a scrapbook, so that the user performs an operation in a touch manner.

The memory 1702 may be configured to store a software program and a module. The processor 1701 performs various function applications of the mobile terminal and implements data processing by running the software program and the module that are stored in the memory 1702. The memory 1702 mainly includes a program storage area and a data storage area. The program storage area may store an operating system, and an application program, such as a sound playing program or an image playing program, that is required by at least one function; and the data storage area may store data (such as audio data or a phone book) that is created based on use of the mobile terminal, and the like. In a specific implementation of the present invention, the memory 1702 may include a volatile memory, for example, a nonvolatile dynamic random access memory (Nonvolatile Random Access Memory, NVRAM for short), a phase change random access memory (Phase Change RAM, PRAM for short), and a magnetoresistive random access memory (magnetoresistive RAM, MRAM for short), and may further include a nonvolatile memory, for example, at least one disk storage component, electrically erasable programmable read-only memory (Electrically Erasable Programmable Read-Only Memory, EEPROM for short), and flash memory component such as an NOR flash memory (NOR flash memory) or an NAND flash memory (NAND flash memory).

The processor 1701 is a control center of the mobile terminal, and is connected to all parts of the entire mobile terminal by using various interfaces and lines. The processor 1701 performs various functions of the mobile terminal and/or processing data by running or executing the software program and/or the module that are/is stored in the memory 1702 and invoking data stored in the memory 1702. The processor 1701 may include an integrated circuit (Integrated Circuit, IC for short), for example, may include a single packaged IC, or may include a plurality of connected packaged ICs with a same function or different functions. For example, the processor 1701 may include only a central processing unit (Central Processing Unit, CPU for short), and may also be a combination of a CPU, a digital signal processor (Digital Signal Processor, DSP for short), a graphic processing unit (Graphic Processing Unit, GPU for short), and a control chip (for example, a baseband chip) in a communications unit. In the implementation of the present invention, the CPU may be a single computing core, or may include a plurality of computing cores.

The communications module 1705 is configured to establish a communication channel, so that the mobile terminal is connected to a communicating peer by using the communication channel, and exchanges data with the communicating peer by using the communication channel. The communications module 1705 may include a wireless communications module such as a wireless local area network (Wireless Local Area Network, wireless LAN for short) module, a Bluetooth module, a near field communication (Near Field Communication, NFC for short), and a baseband (Base Band) module, and a wired communications module such as an Ethernet, a universal serial bus (Universal Serial Bus, USB for short), and a lightning (Lighting, currently used by Apple for a device such as an iPhone5/5s/5c) interface. The communications module is configured to perform communication between all the components in the mobile terminal and the communicating peer, and can support direct memory access (Direct Memory Access).

The technical terms used in the embodiments of the present invention are merely used to describe specific embodiments and are not intended to limit the present invention. In this specification, singular forms "one", "this", and "the" are intended to simultaneously include plural forms unless otherwise specified in the context clearly. Further, the term "include" and/or "includes" used in this specification refers to presence of features, entirety, steps, operations, elements and/or components, but does not preclude presence or addition of one or more other features, entirety, steps, operations, elements and/or components.

Equivalent forms (if the equivalent forms exist) of a corresponding structure, a material, an action, all apparatuses or steps, and functional elements in the appended claims are intended to include, with reference to another explicitly required elements, any structure, material, or action that is used to perform the function. The descriptions of the present invention are given for the purposes of the embodiments and the descriptions, but are not intended to be exhaustive or limit the present invention to the disclosed form. Without departing from the scope and spirit of the present invention, a plurality of modifications and variations are obvious to a person of ordinary skill in the art. The embodiments described in the present invention can better disclose the principle and actual application of the present invention, and enable a person of ordinary skill in the art to understand the present invention.

The flowchart described in the present invention is merely one embodiment, and there may be a plurality of modifications and changes for the flowchart and the steps in the present invention without departing from the spirit of the present invention. For example, the steps may be performed in different sequences, or some steps may be added, deleted or modified. A person of ordinary skill in the art may understand that all or some of the processes that implement the foregoing embodiments and equivalent modifications made in accordance with the claims of the present invention shall fall within the scope of the present invention.

What is claimed is:

1. A terminal device comprising:
   at least one processor; and
   a non-transitory computer-readable storage medium coupled to the at least one processor and storing programming instructions for execution by the at least one processor, wherein the programming instructions instruct the terminal device to:
   obtain target data, wherein the target data comprises at least one data item, and wherein the target data comprises operation event information of operating an electronic terminal by a user, or information that is associated with a user account and that is based on at least one network platform;
   convert the target data into a data image by using a data visualization technology, wherein the data image comprises at least one graphic element, and wherein the graphic element is in a correspondence with the data item; and
   set the data image as wallpaper;
   wherein the data item comprises a preset parameter corresponding to a target operation event, and wherein the programming instructions instruct the terminal device to:
   detect whether the target operation event occurs; and
   in response to determining that the target operation event is detected, update the preset parameter, in the data item, corresponding to the target operation event;
   wherein the target operation event comprises an opening event of a preset-type file, and wherein the preset parameter comprises a picture corresponding to the preset-type file; and
   wherein the converting the target data into a data image by using a data visualization technology comprises: using a picture corresponding to an opened preset-type file as the graphic element, to form the data image as the wallpaper of a lock screen interface.

2. The terminal device according to claim 1, wherein the obtaining target data comprises obtaining the target data in real time, and updating the data image and the wallpaper in real time based on the target data.

3. The terminal device according to claim 1, wherein the setting the data image as the wallpaper comprises:
   tailoring the data image based on a preset size; and
   setting a tailored data image as the wallpaper.

4. The terminal device according to claim 1, wherein before the obtaining target data, the programming instructions instruct the terminal device to:
   receive an input screen wakeup operation, wherein the screen wakeup operation is used to trigger to enter the lock screen interface; and
   wherein after the setting the data image as the wallpaper, the programming instructions instruct the terminal device to:
   display the wallpaper in the lock screen interface.

5. A terminal device comprising:
   at least one processor; and
   a non-transitory computer-readable storage medium coupled to the at least one processor and storing programming instructions for execution by the at least one processor, wherein the programming instructions instruct the terminal device to:
   obtain target data, wherein the target data comprises at least one data item, and wherein the target data comprises operation event information of operating an electronic terminal by a user, or information that is associated with a user account and that is based on at least one network platform;
   convert the target data into a data image by using a data visualization technology, wherein the data image comprises at least one graphic element, and wherein the graphic element is in a correspondence with the data item; and
   set the data image as wallpaper;
   wherein the data item comprises a contact who uses a target application and a total quantity of users of the target application, and wherein the converting target user data into a data image by using a data visualization technology comprises:
   setting, based on the total quantity of the users, a parameter for the graphic element corresponding to the data item; and
   associating the contact who uses the target application with the graphic element for which the parameter is set, to form the data image.

6. A terminal device comprising:
   at least one processor; and
   a non-transitory computer-readable storage medium coupled to the at least one processor and storing programming instructions for execution by the at least one processor, wherein the programming instructions instruct the terminal device to:

obtain target data wherein the target data comprises at least one data item, and wherein the target data comprises operation event information of operating an electronic terminal by a user, or information that is associated with a user account and that is based on at least one network platform;

convert the target data into a data image by using a data visualization technology, wherein the data image comprises at least one graphic element, and wherein the graphic element is in a correspondence with the data item; and set the data image as wallpaper;

wherein the data item comprises a preset parameter corresponding to a target operation event, and wherein the programming instructions instruct the terminal device to:

detect whether the target operation event occurs; and in response to determining that the target operation event is detected, update the preset parameter, in the data item, corresponding to the target operation event;

wherein the target operation event comprises a jump event from a first application to a second application, wherein the preset parameter comprises an identifier of the first application, an identifier of the second application, and a start time of the second application, and wherein the converting the target data into a data image by using a data visualization technology comprises:

arranging, in a preset direction, the identifier of the first application and the identifier of the second application in a sequence of a first-time start time of an application;

using an arc that connects the identifier of the first application and the identifier of the second application as the graphic element, to form the data image so as to easily display the jump event from the first application to the second application; and displaying the wallpaper including visual displaying the identifier of the first application, the identifier of the second application, and the arc.

7. A computer-readable storage medium storing one or more programs, wherein the one or more programs comprise programming instructions, and wherein the programming instructions are executed by a terminal device and instruct the terminal device to:

obtain target data, wherein the target data comprises at least one data item, and wherein the target data comprises operation event information of operating an electronic terminal by a user, or information that is associated with a user account and that is based on at least one network platform;

convert the target data into a data image by using a data visualization technology, wherein the data image comprises at least one graphic element, and wherein the graphic element is in correspondence with the data item; and set the data image as wallpaper;

wherein the data item comprises a preset parameter corresponding to a target operation event, and wherein the programming instructions instruct the terminal device to:

detect whether the target operation event occurs; and in response to determining that the target operation event is detected, update the preset parameter, in the data item, corresponding to the target operation event;

wherein the target operation event comprises an opening event of a preset-type file, and wherein the preset parameter comprises a picture corresponding to the preset-type file; and wherein the converting the target data into a data image by using a data visualization technology comprises: using a picture corresponding to an opened preset-type file as the graphic element, to form the data image as the wallpaper of a lock screen interface.

8. The computer-readable storage medium according to claim 7, wherein the obtaining target data comprises obtaining the target data in real time, and updating the data image and the wallpaper in real time based on the target data.

9. The computer-readable storage medium according to claim 7, wherein the setting the data image as the wallpaper comprises:

tailoring the data image based on a preset size; and setting a tailored data image as the wallpaper.

10. The computer-readable storage medium according to claim 7, wherein before the obtaining target data, the programming instructions instruct the terminal device to:

receive an input screen wakeup operation, wherein the screen wakeup operation is used to trigger to enter the lock screen interface; and wherein after the setting the data image as the wallpaper, the programming instructions instruct the terminal device to:

display the wallpaper in the lock screen interface.

11. A computer-readable storage medium storing one or more programs, wherein the one or more programs comprise programming instructions, and wherein the programming instructions are executed by a terminal device and instruct the terminal device to:

obtain target data, wherein the target data comprises at least one data item, and wherein the target data comprises operation event information of operating an electronic terminal by a user, or information that is associated with a user account and that is based on at least one network platform;

convert the target data into a data image by using a data visualization technology, wherein the data image comprises at least one graphic element, and wherein the graphic element is in correspondence with the data item; and set the data image as wallpaper;

wherein the data item comprises a contact who uses a target application and a total quantity of users of the target application, and wherein the converting target user data into a data image by using a data visualization technology comprises:

setting, based on the total quantity of the users, a parameter for the graphic element corresponding to the data item; and associating the contact who uses the target application with the graphic element for which the parameter is set, to form the data image.

12. A computer-readable storage medium storing one or more programs, wherein the one or more programs comprise programming instructions, and wherein the programming instructions are executed by a terminal device and instruct the terminal device to:

obtain target data, wherein the target data comprises at least one data item, and wherein the target data comprises operation event information of operating an electronic terminal by a user, or information that is associated with a user account and that is based on at least one network platform;

convert the target data into a data image by using a data visualization technology, wherein the data image comprises at least one graphic element, and wherein the graphic element is in correspondence with the data item; and set the data image as wallpaper;

wherein the data item comprises a preset parameter corresponding to a target operation event, and wherein the programming instructions instruct the terminal device to:

detect whether the target operation event occurs; and in response to determining that the target operation event is detected update the reset parameter, in the data item, corresponding to the target operation event;

wherein the target operation event comprises a jump event from a first application to a second application, wherein the preset parameter comprises an identifier of the first application, an identifier of the second application, and a start time of the second application, and wherein the converting the target data into a data image by using a data visualization technology comprises:

arranging, in a preset direction, the identifier of the first application and the identifier of the second application in a sequence of a first-time start time of an application;

using an arc that connects the identifier of the first application and the identifier of the second application as the graphic element, to form the data image so as to easily display the jump event from the first application to the second application; and displaying the wallpaper including visual displaying the identifier of the first application, the identifier of the second application, and the arc.

* * * * *